US008560586B2

(12) United States Patent
Bell

(10) Patent No.: US 8,560,586 B2
(45) Date of Patent: Oct. 15, 2013

(54) LINEAR BIT COUNTING IMPLEMENTATIONS

(76) Inventor: Meltin Bell, Alexandria, VA (US)

( * ) Notice: Subject to any disclaimer, the term of this patent is extended or adjusted under 35 U.S.C. 154(b) by 808 days.

(21) Appl. No.: 12/749,154

(22) Filed: Mar. 29, 2010

(65) Prior Publication Data

US 2011/0238717 A1   Sep. 29, 2011

(51) Int. Cl.
*G06F 7/00* (2006.01)
(52) U.S. Cl.
USPC .......................................................... 708/210
(58) Field of Classification Search
None
See application file for complete search history.

(56) References Cited

U.S. PATENT DOCUMENTS

| | | | | |
|---|---|---|---|---|
| 3,711,692 A | * | 1/1973 | Batcher | 708/210 |
| 4,189,716 A | * | 2/1980 | Krambeck | 341/63 |
| 4,486,848 A | | 12/1984 | Kaminski | |
| 4,607,176 A | | 8/1986 | Burrows et al. | |
| 5,339,447 A | * | 8/1994 | Balmer | 377/82 |
| 5,541,865 A | | 7/1996 | Ashkenazi | |
| 5,682,405 A | | 10/1997 | Smith | |
| 5,717,616 A | | 2/1998 | Morris | |
| 5,734,599 A | | 3/1998 | Lee et al. | |
| 5,995,029 A | | 11/1999 | Ryu | |
| 6,173,300 B1 | | 1/2001 | Mahurin | |
| 6,516,330 B1 | | 2/2003 | Hicks et al. | |
| 6,729,168 B2 | | 5/2004 | Hossain | |
| 7,584,233 B2 | | 9/2009 | Koob et al. | |
| 2002/0073127 A1 | * | 6/2002 | Hossain | 708/210 |
| 2002/0095450 A1 | | 7/2002 | Karim et al. | |

* cited by examiner

*Primary Examiner* — David H Malzahn

(57) ABSTRACT

Counting the number of set and unset bits in an n-bit data word or stream of data is most efficient in applications where the data can be characterized as sparsely populated (bits mostly or all unset/0) and/or heavily populated (bits mostly or all set/1). In these populations, processing can be linearly proportional to the smaller number of differing bit values resulting in compute time and resource savings. In any population, the operations of the bit counting methods, systems, apparata and computer program products described are bounded by the number of bits counted in the data word/stream. The described operations can be used for determining whether further processing of the data stream is required as well as the extent of that processing.

18 Claims, 5 Drawing Sheets

Linear Bit Counting Flowchart Template

LINEAR BIT COUNTING IMPLEMENTATIONS

TECHNICAL FIELD AND INDUSTRIAL APPLICABILITY OF THE INVENTION

This invention relates generally to methods, computer program products and apparata for counting the number of set or unset bits in words within data processing systems.

BACKGROUND OF THE INVENTION

Repeatedly counting the number of set bits is required in graphics and cryptography operations. Known methods for counting these bits include
- checking each bit in turn, keeping a running total of the number of set bits found by incrementing a counter when the checked bit is a '1',
- clearing the least significant set bit of the word using x=x & (x−1) where '&' signifies the logical AND operation while keeping a count of the number of times that a set bit has been cleared until the word is all zeros after which the count is returned,
- using a lookup table to count bits in part of the word, summing the results from the individual parts and
- generating intermediate words by masking and shifting, summing the intermediate words into derivative word fields representing the sum of a group of bits in the word and summing the fields of the derivative word with shift, add and mask operations whereby the resulting sum value represents the number of set bits in the data word with the best performing of the above methods using shift operations (see column 1, line 10 through column 2, line 35 of U.S. Pat. No. 6,516,330 B1 "Counting Set Bits in Data Words" to Hicks et al, hereinafter referred to as Hicks). Shifting is also taught in U.S. Pat. No. 4,486,848 "Microprocessor Parallel Additive Execution of a Computer Count Ones Instruction" to Kaminski (see column 1, lines 40-55).

In addition to Hicks, U.S. Pat. No. 5,717,616 "Computer Hardware Instruction and Method for Computing Population Counts" to Morris and U.S. Pat. No. 5,734,599 "Performing a Population Count Using Multiplication" to Lee et al (hereinafter Lee) also identify counting the number of 1s as useful for many types of algorithms especially cryptographic analysis (see Morris column 1, line 10 through column 3, line 5 and Lee column 1, line 5 through column 2, line 40). Morris further presents the need in the industry for a new apparatus and method that can be implemented conveniently resulting in greater CPU design flexibility and faster computation than prior art methods while Lee suggests the desirability of alternate ways to efficiently perform such calculations with a minimum of hardware. A circuit with a substantially reduced size is also taught as an improvement in U.S. Pat. No. 4,607,176 "Tally Cell Circuit" to Burrows et al (see column 1, line 50 through column 2, line 10).

Though the above approaches identify set bit counting hardware and performance requirements, the expense and complexity of the shifters, multipliers and parallel circuitry in the prior art may provide little if any benefits in transmission or other applications that count the number of unset or zero bits in data characterized by a significantly smaller number of differing values (e.g. either heavily or sparsely populated as in the discussion of the ones density requirement of T1 digital signals in column 1, line 45 through column 2, line 45 of U.S. Pat. No. 5,682,405 "Ones Density Monitor" to Smith: 175+/− 75 consecutive zeroes in the definition of carrier loss as well as circuitry for detecting when at least four of thirty-two bits are set to indicate carrier on line status or the lost carrier reset flag).

SUMMARY OF THE INVENTION

As a consequence of the preceding considerations, the motivation for the present invention is to provide alternatives for achieving linear or better performance in counting the number of set and unset bits without costing additional or complicated hardware while minimizing the repetitions necessary in a variety of applications. Each of the three implementations of the present invention described in more detail later model the following pseudocode:
a) initializing a return value bit counter variable to the maximum number of bits to be counted or zero; and
b) while all bits in the value being counted are not 1 or 0, repeating the following operations b1-b2:
   b1) setting the value being counted to the result of ORing or ANDing it with itself and one greater or less than itself; and
   b2) decrementing or incrementing by 1 the return value bit counter variable, whereby the resulting return value bit counter variable represents the number of set/1 or unset/0 bits in the data word.

The advantages of the present invention are even more evident in three types of environments:
- limited code space
- limited data space and
- limited compute time.

Code space advantages are clear when the disclosed methods, systems, apparata and computer program products are compared to routines/implementations using if-then-else or switch-case statement(s) for counting the number of set/1 or unset/0 bits in any 32 bit number, for example. Since it is very common for routines to use more than one local variable for computation and returning the results of its computation, the use of only one local variable in each disclosed routine represents the advantage in data space. The advantage of the disclosed implementations in compute time can be determined by examining the maximum number of comparison operations (normally performed by one computer instruction) between the disclosed approaches and an if-then-else or switch-case statement approach, 32 versus 4294967296. In short, the inventions are most significant in environments where time and space efficiencies are critical and/or resource usage must be minimized.

BRIEF DESCRIPTION OF THE DRAWINGS/FIGURES

Preferred embodiments of the invention will now be described, by way of example, with reference to the accompanying drawings in which.

DETAILED DESCRIPTION OF THE PREFERRED EMBODIMENTS

Figure 1:
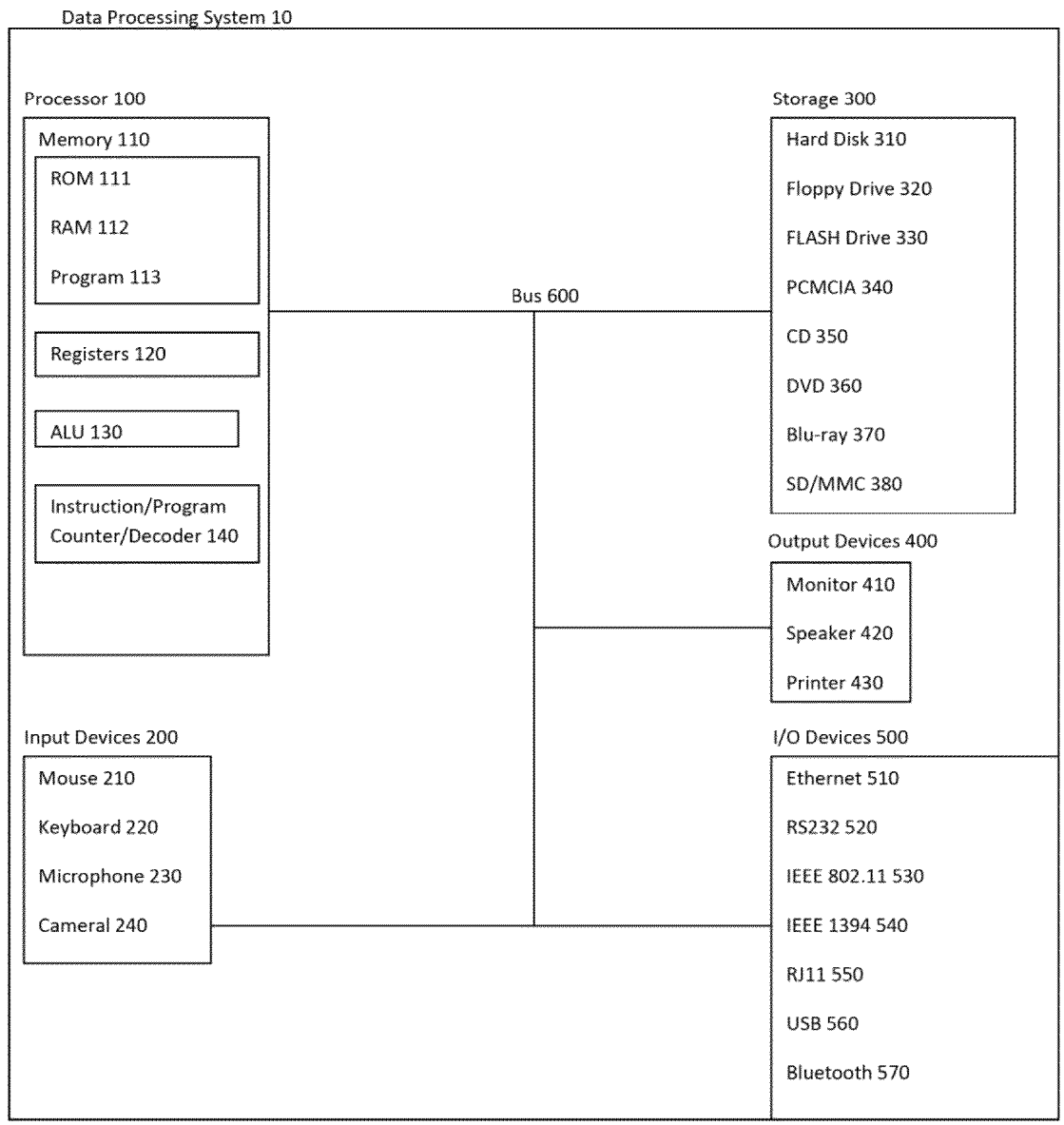
FIG. 1 is a block diagram of a data processing system.

The present invention can be implemented as a method, computer program product and/or apparatus by software configured to run in a generally available data processing system as illustrated in FIG. 1. Data processing system 10 includes processor 100 attached via system bus 600 to storage 300, input devices 200, output devices 400 and I/O devices 500.

Processor 100 executes a program (113) of instructions from memory 110 such as random access memory (RAM) 112 and/or read only memory (ROM) 111. Registers 120, arithmetic logic unit (ALU) 130 and instruction/program counter/decoder 140 are also commonly used to implement any appropriate processor available from a number of vendors (PowerPC, 80×86, Pentium, etc.). Processor logic 100 enables the determination of the number of set and/or unset bits in a data word through software embodiments of the invention that may be supplied separately, as an element of the program code for a specific application in a processing system or otherwise, for loading in the processor in a known manner. The processor may also be supplied preconfigured with software performing invention functions. Invention functions can also be implemented by control circuitry through the use of logic gates, programmable logic devices or other hardware components in lieu of a processor-based system.

Storage 300 could comprise a number of individual volatile or non-volatile memory modules (hard disk 310, floppy drive 320, FLASH drive 330, PCMCIA 340, CD 350, DVD 360, Blu-ray 370, SD/MMC 380) that store segments of operating system and application software (i.e. programs and data) that will be swapped into and ran on processor 100 in whole or in part through bus 600.

Output devices 400 could be a device for presenting data to the user, such as monitor 410, speaker 420 and/or printer 430.

Input devices 200 could be a device for presenting data to processing system 10 including, but not limited to mouse 210, keyboard 220, microphone 230 and camera 240.

I/O devices 500 allows for locally or remotely exchanging information with data processing system 10 through universal serial bus (USB) 560, Bluetooth 570, Ethernet 510, RS-232 520 and RJ-11 550 as well as IEEE 802.11 530 and IEEE 1394 540.

While a specific hardware configuration is given, the inventions described could in general be practiced using any hardware configuration that allows counting the number of set and unset bits in data words. As will be explained, aspects of the preferred embodiments pertain to specific steps implementable on computer systems such as through a computer program product/function delivered via a variety of signal-bearing media including storage 300 as well as through a wired and/or wireless network (e.g. Ethernet 510, telephone 550, Wi-Fi 530, etc.). Such signal-bearing, when carrying computer-readable instructions that direct the functions of the present invention, represent alternative embodiments of the present invention.

When the number of set or unset bits in a word are to be counted, the word is supplied to a register 120 by the instruction/program counter/decoder 140. Successive instructions read from signal-bearing media storage 300 and/or network are then implemented to process the input word according to a method, system, computer program product or apparatus embodying the invention whereby the resulting sum value indicating the number of set or unset bits is output. Though the present invention may be used to count the number of ones and zeros in various applications, the better than linear performance of three embodiments is preferred:

1. counting the ones in a heavily populated value, such as 011,
2. counting the zeros in a sparsely populated value, such as 001 and
3. counting the zeros in a heavily populated value, such as 011.

Figure 5:
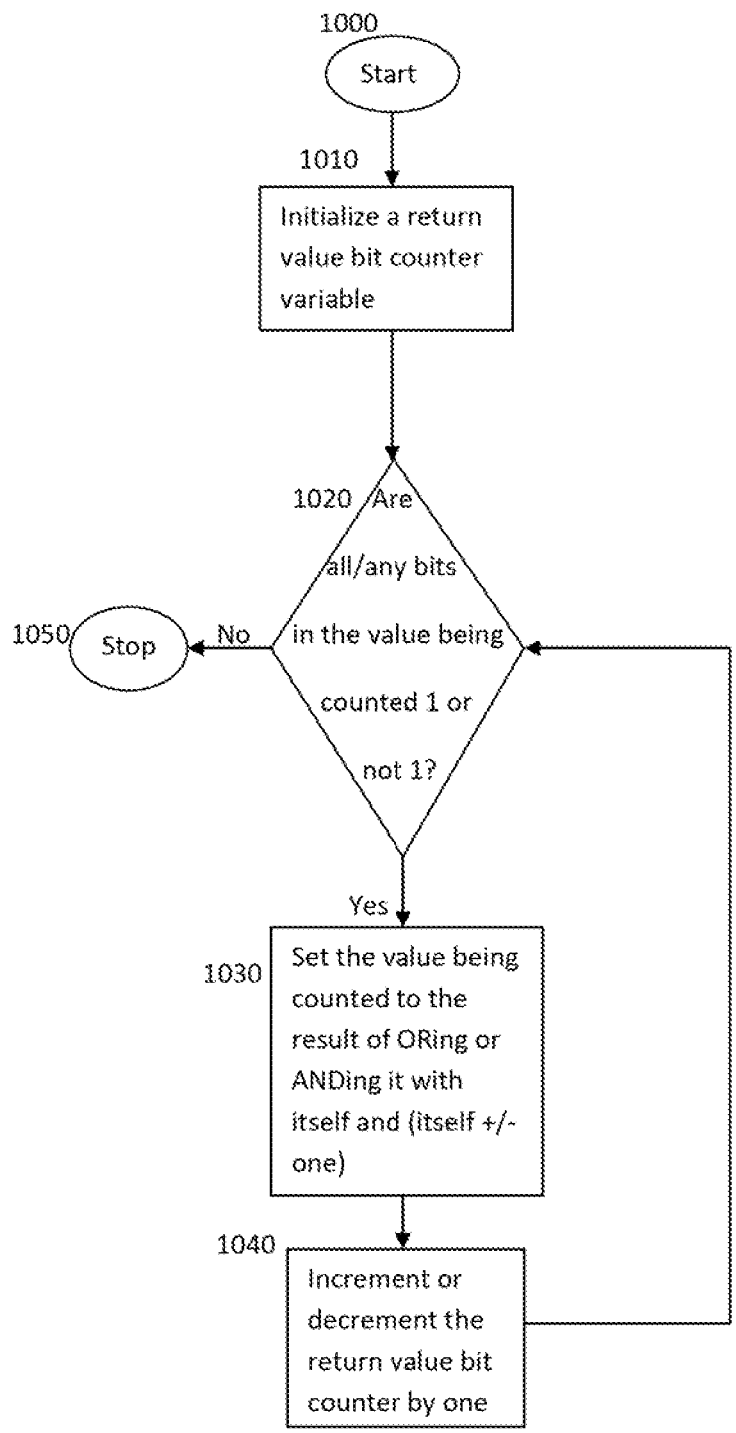
FIG. 5 is a flowchart describing the operation of all three third preferred embodiments.

The series of operations performed by the processor in implementing these three embodiments is defined by Java and C/C++ program listings comparable to the flowchart of FIG. 5. It will be appreciated, however, that the actual instruction set stored may be other lower or higher level code where the value being counted has different values or is larger or smaller than three bits.

Preferred Embodiment 1

Counting the ones in a heavily populated value, such as 011:

| Java | C/C++ |
|---|---|
| public int lbc1_(int val) | unsigned int lbc1_uint(unsigned int val) |
| { | { |
|   int bc = 3; |   unsigned int bc=3; |
|   while (val != 0x111) // loop begin |   while (val != 0x111) // loop begin |
|   { |   { |
|     val |= (val + 1); |     val |= (val + 1); |
|     bc--; |     bc--; |
|   } |   } |
|   return bc; |   return bc: |
| } | } |

Figure 2:
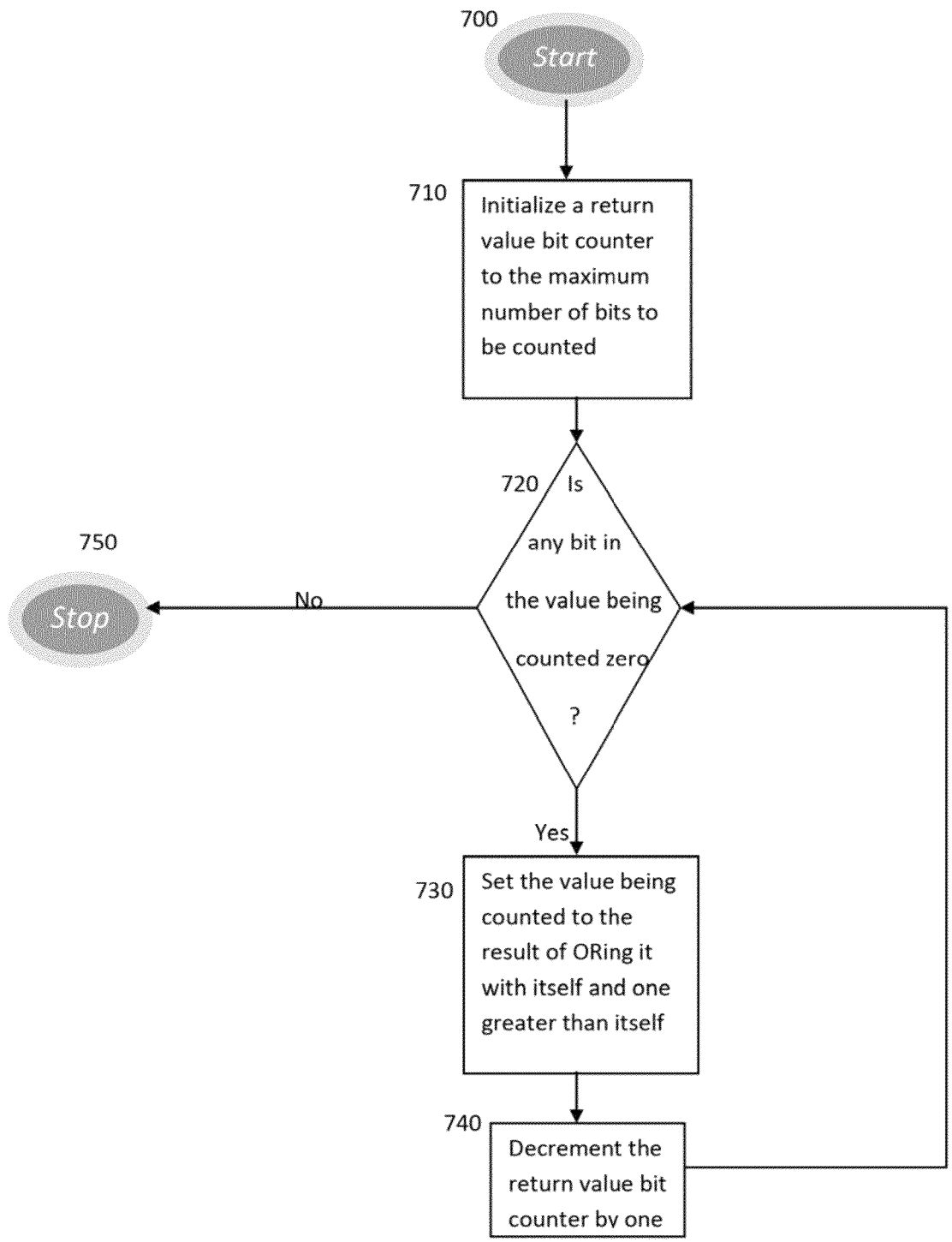
FIG. 2 is a flowchart describing the operation of the first preferred embodiment.

FIG. 2 offers a flow chart of lbc1_/lbc1_uint. After Start 700, the return value bit counter (bc) is initialized to the maximum number of bits to be counted at box 710. Control flow then passes to decision diamond 720, where the program continues to box 730 if any bit in the value being counted is zero; otherwise, the function/routine stops at 750 with the result in the return value bit counter. When control flow passes to box 730, the value being counted is set to the result of ORing it with itself and one greater than itself. Progressing to box 740, the return value bit counter is decremented by one before directing control flow to the beginning of the loop at decision diamond 720. Starting with val=011, a table of values for each iteration through the loop further demonstrates the performance of this preferred embodiment:

| loop # | val at loop begin | bc at loop begin |
|---|---|---|
| 1 | 011 = 3 | 3 |
| 2 | 111 = 7 | 2 |

That the loop is entered only once to count the two set bits makes its efficiency clear, especially when other inventions may enter a loop for each bit or at least each unset bit (i.e. three or two times, respectively, instead of once).

Preferred Embodiment 2

Counting the zeros in a sparsely populated value, such as 001:

| Java | C/C++ |
|---|---|
| public int lbc0_(int val) | unsigned int lbc0_uint(unsigned int val) |
| { | { |
|   int bc = 3; |   unsigned int bc = 3; |
|   while (val > 0) // loop begin |   while (val > 0) // loop begin |
|   { |   { |
|     val &= (val − 1); |     val &= (val − 1); |

| Java | C/C++ |
|---|---|
|     bc--;<br>  }<br>  return bc;<br>} |     bc--;<br>  }<br>  return bc;<br>} |

Figure 3:
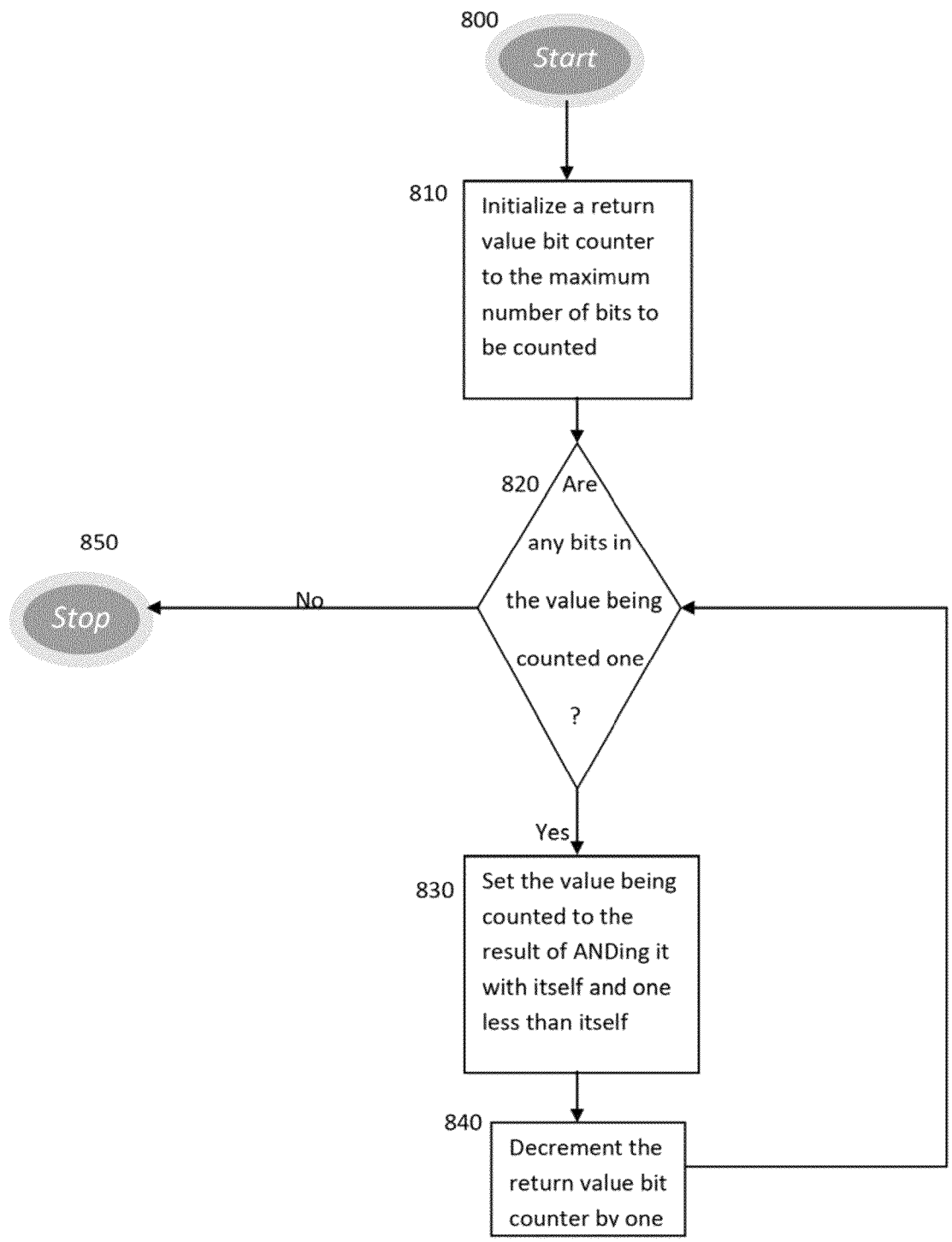
FIG. 3 is a flowchart describing the operation of the second preferred embodiment.

FIG. 3 offers a flow chart of lbc0_ and lbc0_unit. After Start 800, the return value bit counter (bc) is initialized to the maximum number of bits to be counted at box 810. Control flow then passes to decision diamond 820, where the program continues to box 830 if any bits in the value being counted are one; otherwise, the function/routine stops at 850 with the result in the return value bit counter. When control flow passes to box 830, the value being counted is set to the result of ANDing it with itself and one less than itself. Progressing to box 840, the return value bit counter is decremented by one before directing control flow to the beginning of the loop at decision diamond 820. Starting with val=001, a table of values for each iteration through the loop further demonstrates the performance of this preferred embodiment:

| loop # | val at loop begin | bc at loop begin |
|---|---|---|
| 1 | 001 = 1 | 3 |
| 2 | 0 | 2 |

That the loop is entered only once to count the two unset bits makes its efficiency clear, especially when other inventions may enter a loop for each bit or at least each unset bit (i.e. three or two times, respectively, instead of once).

Preferred Embodiment 3

Counting the zeros in a heavily populated value, such as 011:

| Java | C/C++ |
|---|---|
| public int lbc0(int val)<br>{<br>  int bc = 0;<br>  while (val != 0x111) // loop<br>  begin<br>  {<br>    val \|= (val + 1);<br>    bc++;<br>  }<br>  return bc;<br>} | unsigned int lbc0uint(unsigned int val)<br>{<br>  unsigned int bc = 0;<br>  while (val != 0x111) // loop<br>  begin<br>  {<br>    val \|= (val + 1);<br>    bc++;<br>  }<br>  return bc;<br>} |

Figure 4:
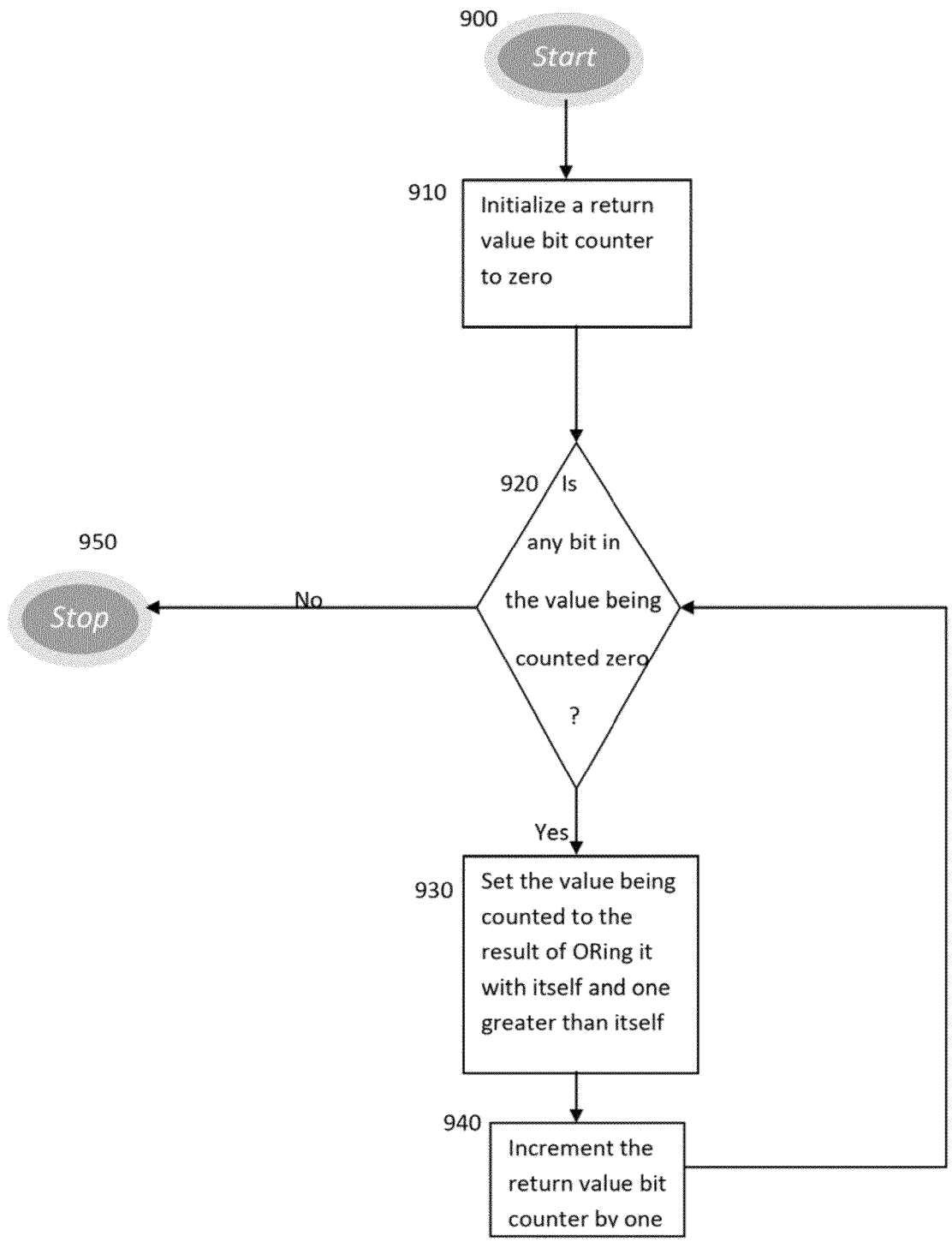
FIG. 4 is a flowchart describing the operation of the third preferred embodiment.

FIG. 4 offers a flow chart of lbc0 and lbc0uint. After Start 900, the return value bit counter (bc) is initialized to zero at box 910. Control flow then passes to decision diamond 920, where the program continues to box 930 if any bit in the value being counted is zero; otherwise, the function/routine stops at 950 with the result in the return value bit counter. When control flow passes to box 930, the value being counted is set to the result of ORing it with itself and one greater than itself. Progressing to box 940, the return value bit counter is incremented by one before directing control flow to the beginning of the loop at decision diamond 920. Starting with val=011, a table of values for each iteration through the loop further demonstrates the performance of this preferred embodiment:

| loop # | val at loop begin | bc at loop begin |
|---|---|---|
| 1 | 011 = 3 | 0 |
| 2 | 111 = 7 | 1 |

That the loop is entered once to count the only unset bit makes its efficiency clear, especially when other inventions may enter a loop for each bit or at least each set bit (i.e. three or two times, respectively, instead of once).

While three specific preferred embodiments of the present linear bit counting invention have been described in detail as associated with logical components and controlled sequences for exerting sequential information manipulation and control within such elements, the disclosure of the present invention is intended to be illustrative and not limiting. Though implementable by microprogrammable control or derived from timing chains and discrete control logics, it will be understood by those skilled in the art that the basic principles of the invention may be altered in form and detail without departing from the spirit and scope of the appended claims.

The embodiments of the invention in which an exclusive property or privilege is claimed are defined as follows:

1. A method of counting the number of set/1 bits in an n-bit data word in a data processing system comprising:
   a) initializing a return value bit counter variable to the maximum number of bits to be counted; and
   b) while all bits in the value being counted are not 1, repeating the following operations b1-b2:
   b1) setting the value being counted to the result of ORing itself and one greater than itself; and
   b2) decrementing by 1 the return value bit counter variable, whereby the resulting return value bit counter variable represents the number of set/1 bits in the data word.

2. A data processing system, comprising:
   a processor;
   storage coupled to the processor; and
   program code residing in the storage and executing on the processor,
   wherein the program code configures the processor to perform the method of claim 1.

3. A computer program product comprising a memory storing a computer program code which, when loaded in a processor of a data processing system, configures the processor to perform the steps of claim 1.

4. An apparatus for counting the number of set/1 bits in an n-bit data word in a data processing system comprising:
   means for performing the functions of claim 1.

5. The method of claim 1, wherein n=64.

6. The method of claim 1, wherein n=128.

7. A method of counting the number of unset/0 bits in an n-bit data word in a data processing system comprising:
   c) initializing a return value bit counter variable to the maximum number of bits to be counted; and
   d) while the value being counted is nonzero, repeating the following operations b1-b2:
   b1) setting the value being counted to the result of ANDing itself and one less than itself; and
   b2) decrementing by 1 the return value bit counter variable, whereby the resulting return value bit counter variable represents the number of unset/0 bits in the data word.

8. A data processing system, comprising:
   a processor;
   storage coupled to the processor; and
   program code residing in the storage and executing on the processor, wherein the program code configures the processor to perform the method of claim 7.

9. A computer program product comprising a memory storing a computer program code which, when loaded in a processor of a data processing system, configures the processor to perform the steps of claim 7.

10. An apparatus for counting the number of unset/0 bits in an n-bit data word in a data processing system comprising:
   means for performing the functions of claim 7.

11. The method of claim 7, wherein n=64.

12. The method of claim 7, wherein n=128.

13. A method of counting the number of unset/0 bits in an n-bit data word in a data processing system comprising:
   e) initializing a return value bit counter variable to zero; and
   f) while all bits in the value being counted are not 1, repeating the following operations b1-b2:
   b1) setting the value being counted to the result of ORing itself and one greater than itself; and
   b2) incrementing by 1 the return value bit counter variable, whereby the resulting return value bit counter variable represents the number of unset/0 bits in the data word.

14. A data processing system, comprising:
   a processor;
   storage coupled to the processor; and
   program code residing in the storage and executing on the processor,
   wherein the program code configures the processor to perform the method of claim 13.

15. A computer program product comprising a memory storing a computer program code which, when loaded in a processor of a data processing system, configures the processor to perform the steps of claim 13.

16. An apparatus for counting the number of unset/0 bits in an n-bit data word in a data processing system comprising:
   means for performing the functions of claim 13.

17. The method of claim 13, wherein n=64.

18. The method of claim 13, wherein n=128.

\* \* \* \* \*